(12) United States Patent
Kersavage et al.

(10) Patent No.: US 8,131,392 B2
(45) Date of Patent: Mar. 6, 2012

(54) SYSTEM AND METHOD FOR USING MANUFACTURING STATES OF VEHICLE PRODUCTS FOR DISPLAY OF A MANUFACTURING PROCESS

(75) Inventors: Kerwin K Kersavage, Snohomish, WA (US); Rex Allen Lohoff, Everett, WA (US); Craig E McDonel, Bothell, WA (US); Daniel M Eide, Renton, WA (US); Lance G. Krauter, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 314 days.

(21) Appl. No.: 12/036,597

(22) Filed: Feb. 25, 2008

(65) Prior Publication Data
US 2009/0216804 A1    Aug. 27, 2009

(51) Int. Cl.
*G06F 19/00* (2006.01)
*G06G 1/14* (2006.01)
(52) U.S. Cl. .............. 700/97; 705/7.22; 700/95
(58) Field of Classification Search .......... 700/97; 705/7.22
See application file for complete search history.

(56) References Cited

U.S. PATENT DOCUMENTS
4,945,488 A * 7/1990 Carver et al. ............ 700/182
(Continued)

FOREIGN PATENT DOCUMENTS
EP    1881384 A1 *  1/2008

OTHER PUBLICATIONS
United States Patent & Trademark Office (International Searching Authority), International Search Report and Written Opinion for PCT/US2009/32406; Sep. 17, 2010.

*Primary Examiner* — Kakali Chaki
*Assistant Examiner* — Sivalingam Sivanesan
(74) *Attorney, Agent, or Firm* — Klintworth & Rozenblat IP LLC (57) ABSTRACT

A system and method of using manufacturing states in a manufacturing process is provided in which manufacturing states for an article of manufacture are defined at different time periods of a manufacturing process for display as manufacturing contexts relating to an installation plan. The manufacturing states for the article of manufacture are stored in a process database as the manufacturing states are defined during the manufacturing process. The manufacturing contexts relating to the installation plan for the article of manufacture are visually displayed with at least one other manufacturing context relating to another installation plan for another article of manufacture.

24 Claims, 4 Drawing Sheets

U.S. PATENT DOCUMENTS

| | | | |
|---|---|---|---|
| 6,272,387 B1 * | 8/2001 | Yoon | 700/83 |
| 6,434,441 B1 * | 8/2002 | Beauchamp et al. | 700/98 |
| 7,082,590 B2 * | 7/2006 | Kragh et al. | 716/129 |
| 7,606,628 B2 * | 10/2009 | Azuma | 700/107 |
| 2007/0106410 A1 * | 5/2007 | Bouffiou et al. | 700/97 |
| 2007/0141899 A1 | 6/2007 | Saini et al. | |
| 2008/0021583 A1 | 1/2008 | Tibaud | |

* cited by examiner

SYSTEM AND METHOD FOR USING MANUFACTURING STATES OF VEHICLE PRODUCTS FOR DISPLAY OF A MANUFACTURING PROCESS

FIELD OF THE INVENTION

This invention relates generally to information technology, and more particularly, to systems and methods for production planning in manufacturing processes.

BACKGROUND OF THE INVENTION

Complex manufacturing projects such as the design and manufacture of aircraft generally require that engineering information, component parts and processes be successfully integrated. With regard in particular to the production of aircraft, typically hundreds of thousands of parts and associated processes must be successfully integrated according to a comprehensive plan to produce an aircraft in accordance with the engineering information.

Engineering information typically includes engineering drawings and parts lists that cooperatively form an engineering product plan that describes how materials, components assemblies and sub-assemblies must be combined to form the desired product. A manufacturing process plan is subsequently compiled so that the identified parts in the desired product may be properly scheduled for assembly on the factory floor. Suitable scheduling and coordination is particularly important in complex projects since factors such as the overall cost of the project, the time required for completion of the project, and the risk of failure must be accurately estimated. In addition, other variables of importance such as the overall efficiency of the project need to be accurately estimated. Accordingly, the manufacturing process plan typically includes factory floor planning, tool planning and scheduling, compilation of work plans for assembly personnel, assembly plans, and other similar activities.

Although existing process planning and analysis methods are useful, they nevertheless exhibit several drawbacks, and thus may not accurately represent a selected process. For example, the planned configuration, as expressed in the manufacturing process plan may require assembly of the product in a sequence not contemplated by the designed configuration, as expressed in the engineering process plan. Since existing methods generally do not permit variability in tasks or resources in the process to be effectively resolved, conflicts that arise during the product assembly must often be resolved informally on the factory floor, which in turn, often requires expensive and time-consuming rework.

In conventional systems, in-process manufacturing views or simulations of different manufacturing contexts are only visible in the installation plan that they were created in. For example, wire harness manufacturing context for an aircraft is only visible in its created installation plan, oxygen tube manufacturing context of the aircraft is visible (by manufacturing engineers, for example) in its installation plan and so forth. If reference to the manufacturing views is needed or reuse of them in a later manufacturing process is required, the manufacturing views need to be re-created from scratch. In order to reduce or eliminate a significant amount of redundant work, it is desirable to model a lifecycle of a manufacturing context and relate the lifecycle across multiple control station installation plans. Further, it is desirable to make these visual representations of manufacturing states (such as wire harness manufacturing states in an aircraft) available for efficient use and re-use throughout the build cycle.

SUMMARY

A method of using manufacturing states in a manufacturing process is provided in which manufacturing states for an article of manufacture are defined at different time periods of a manufacturing process for display as manufacturing contexts relating to an installation plan. The manufacturing states for the article of manufacture are stored in a process database as the manufacturing states are defined during the manufacturing process. The manufacturing contexts relating to the installation plan for the article of manufacture are visually displayed with at least one other manufacturing context relating to another installation plan for another article of manufacture.

A computer-implemented system for using manufacturing states in a manufacturing process is also provided. A process authoring application is used for defining manufacturing states for an article of manufacture at different time periods of a manufacturing process for display as manufacturing contexts relating to an installation plan. A process database stores the manufacturing states of the article of manufacture as the manufacturing states are defined during the manufacturing process. A display device visually displays the manufacturing contexts relating to the installation plan for the article of manufacture with at least one other manufacturing context related to another installation plan for another article of manufacture. Advantageously, storage of these manufacturing states in a process database depicting the evolution of the article of manufacture over time allows the user to utilize these states to establish the holistic context of a larger article of manufacture, that the article of manufacture is a component of, at a specific point in time. In this manner, manufacturing states created and stored by the users may be retrieved to establish the context of the larger article of manufacture without having to re-create the states of the articles of manufacture in close proximity to the users' subject article of manufacture.

DETAILED DESCRIPTION

A system and method for using manufacturing states in a manufacturing process is provided in which manufacturing states for an article of manufacture are defined at different time periods of a manufacturing process for display as manufacturing contexts relating to an installation plan. An article of manufacture may relate to a sub-assembly or component that is part of a larger assembly or product. The manufacturing states for the article of manufacture are stored in a process database as the manufacturing states are defined during the manufacturing process. The manufacturing contexts relating to the installation plan for the article of manufacture are visually displayed with at least one other manufacturing context relating to another installation plan for another article of manufacture. As provided herein, defining and storing manufacturing states may be performed through utilization of a multi-dimensional visualization process authoring application. In one example, an article of manufacture may selectively include, for instance, an electrical wire harness or tubing run for installation in an aircraft.

The manufacturing states are assigned to activity objects with the manufacturing state activity objects stored in the process database. A relationship is created between manufacturing state activity objects and process objects which is stored in the process database. In defining manufacturing states, a process definition that includes production tasks referencing part locations and tooling is developed. Developing the process definition may include determining the process required to perform an installation of the article of manufacture as defined by engineering data.

As provided herein, components are identified for manufacturing contexts. A determination may be made as to the number of different states the article of manufacture will pass through before reaching a final installed state defined by engineering data. The criteria to define a manufacturing context from the engineering data or manufacturing state data is established. Manufacturing context criteria is assigned to the installation plan and the manufacturing context is assigned to an operation within the installation plan using a manufacturing state activity object. The manufacturing context may also be saved to the process database.

Figure 1:
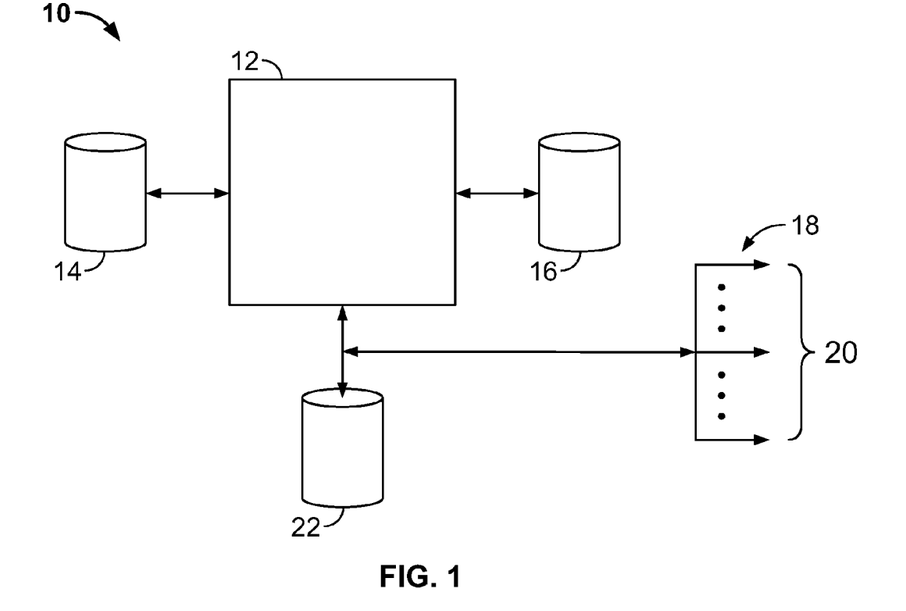
FIG. 1 is a block diagrammatic view of a system for production planning in a manufacturing process, according to an embodiment of the invention.

FIG. 1 is a block diagrammatic view of an apparatus 10 for production planning in a manufacturing process, according to an embodiment of the invention. The apparatus 10 includes a processing unit 12 that generally includes any programmable electronic device that is operable to receive programming instructions and input data, and to process the data according to the programming instructions. Although a single processing unit is shown in FIG. 1, the processing unit 12 may be comprised of a plurality of processing units that are coupled serially or in parallel so that each processing unit performs a selected portion of a total computational task performed by the processing unit 12. The apparatus 10 also includes a product information database 14 that is operable to store engineering information of various types. For example, the engineering information database 14 may include digital representations of selected component parts that collectively comprise the product generated in the manufacturing process. Accordingly, the digital representations may include two-dimensional and/or three-dimensional digital models that are compatible with known computer-aided design (CAD) systems, such as the CATIA digital modeling system, available from Daussault Systemes Corporation of Suresnes, France, although other suitable digital modeling systems exist. Other engineering information may be included in the database 14. For example, the database 14 may include drawing trees that permit engineering drawings to be accessed in an ordered manner, as well as parts lists that define the configuration of the product. Other information stored in the database 14 may include part tolerances and process specifications such as torque, bonding and grounding requirements, and any other desired information. In a particular embodiment of the invention, the engineering information database 14 may be compiled as disclosed in a co-pending and commonly owned U.S. patent application Ser. No. 11/013,311 filed on Dec. 15, 2004, entitled "Systems and Methods for Process-Driven Bill of Material", which application is incorporated by reference herein.

The apparatus 10 also includes a process information database 16 that is operable to store process-related information for the product generated in the manufacturing process. Briefly and in general terms, the process information database 16 may include part resource and planning relationships for a selected component part or assembly. In particular, the planning relationships may include precedence networks that describe a predetermined assembly sequence for a component part or assembly. In the present discussion, a precedence network is a multi-dependency representation of a project that includes the various activities in the project depicted as nodes, and further includes sequence elements that express at least a temporal relationship between the various nodes. In a particular embodiment of the present invention, the process structures may include data structures that are created as disclosed in a co-pending and commonly owned U.S. patent application Ser. No. 11/012,901 filed on Dec. 15, 2004, entitled "System and Method for Production Planning Analysis Using Discrete Event Simulation", which application is incorporated by reference herein. Although FIG. 1 shows the databases 14 and 16 as discrete operational units, it is understood that the informational content of the databases 14 and 16 may be incorporated into a single unit.

With continued reference to FIG. 1, the apparatus 10 includes a communications system 18 that is configured to communicate with the processor 12. Accordingly, the communications system 18 may be used to provide engineering and/or planning data to the processor 12, which may suitably format the engineering and/or planning data for storage in the database 14 and the database 16. The communication system 18 may include a wide area network (WAN) or a local area network (LAN), but in a particular embodiment, the communications system 18 includes an internet-based system. In any case, the communications system 18 is coupled to one or more requesters 20 that communicate with the processor 12 through the communications system 18. The one or more requesters 20 thus provide engineering and/or planning data to the processor 12, and receive suitably processed data from the processor 12 through the communications system 18.

The apparatus 10 includes a storage device 22 that receives processed information from the processing unit 12, which will be described in greater detail below. Alternatively, the storage device 22 may also serve as an intermediate storage location for information generated by the processor 12 before the information is transferred to one or more information requesters 20.

The operation of the apparatus 10 of FIG. 1 will now be described in detail. As discussed above, the requesters 20 may transfer engineering and/or planning data to the apparatus 10 through the communications system 18 so that the data is available to the processor 12. The engineering data generally describes the configuration of a desired product, such as a commercial aircraft, while the planning data generally comprises a scheduling definition, which is generally expressed as a precedence network. Briefly, and in general terms, the planning data describes the sequence definition that may be used to define the schedule. The processing unit 12 accordingly processes the data to generate "context" information that reflects a selected assembly or sub-assembly at a desired stage of assembly.

For example, in one particular embodiment, and with reference to aircraft production, hydraulics, fuel and electrical systems (such as electrical wire harness systems), and structural design may generally be executed and planned by different organizations that may develop respective designs and planning information with minimal mutual interaction. Accordingly, one or more conflicts may result during integration of the foregoing systems and structures designs. For example, at a selected integration step, it may be determined that the assembly must be partially disassembled in order to permit the installation of other systems and/or structural components because the prior integration steps were not properly ordered. Further, at the selected integration step, it may become apparent that sufficient access is not present to admit a tool and/or a hand to affect the integration step, due to an error in the design of a system and/or a structural component. Accordingly, the context information generated within the processor 12 includes two and/or three-dimensional digital models (e.g., models created using the CATIA digital modeling system, or other similar modeling systems) that may be retrieved from the product information database 14 that are selectively combined with information in the process information database 16 to provide a graphical view (on a display device) of an assembly at a selected integration step. Thus, if conflicts are observed in the context information, the product information (stored in database 14) and/or the process information (stored in database 16) the information may be readily altered to specify a different design and/or assembly sequence to avoid the observed conflicts. Accordingly, conflicts between the product, process and resource definitions may be advantageously resolved prior to the release of the foregoing definitions.

Figure 2:
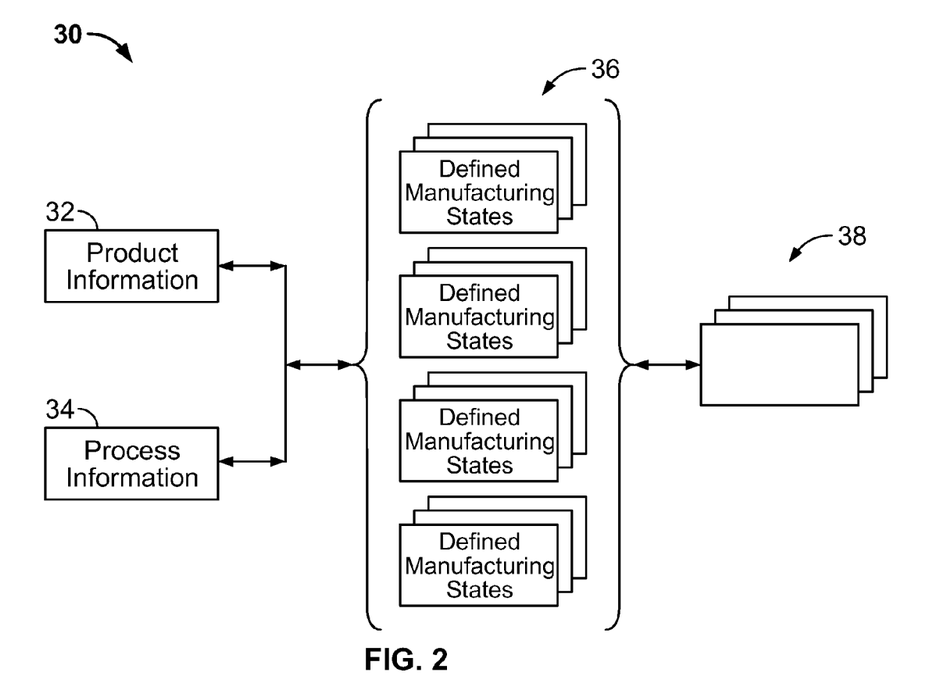
FIG. 2 is a partial schematic view of a system of managing product and process information in a manufacturing process, according to another embodiment of the invention.

FIG. 2 is a partial schematic view of a method 30 of creating and managing a manufacturing plan in a manufacturing process, according to another embodiment of the invention. The method 30 includes compiling a product information source 32 and a process information source 34 that are generally separately compiled and provide design configuration information for components, assemblies and/or sub-assemblies, and assembly sequencing and planning information, respectively. The product information source 32 and the process information source 34 thus include information for a variety of interrelated systems that are generally prepared by various engineering and planning groups.

As further shown in FIG. 2, selected portions of the product information source 32 and the process information source 34 may be extracted and processed (as described in detail with reference to FIG. 1) to generate a plurality of contexts 36. The contexts 36 are graphical representations of selected assemblies and/or sub-assemblies that may be reviewed by affected engineering and/or planning groups so that conflicts resulting from planning and/or engineering errors may be detected. For example, the design of components that comprise the selected assembly may introduce conflicts that preclude assembly efficiency by requiring partial disassembly of a previously assembled object so that access for a hand, a tool, or other required access, may be obtained. Similarly, planning information conflicts may introduce the foregoing access difficulties, and may also introduce difficulties of different kinds. For example, the planning information may require the use of selected installation tools, which are not subsequently removed. Consequently, the installation tools may undesirably be incorporated into the assembly.

Similarly, other manufacturing engineers or planners may leave their product in a manufacturing state other than the engineering defined assembly state. Examples of this for an aircraft assembly may be a door that is left open, landing gear down, partially assembled articles of manufacture and the like. If other manufacturing engineers or planners do not have visibility of these states, they may create or otherwise have a false notion of the state or manufacturing context of the larger article of manufacture. Manufacturing engineers in other disciplines will only have visibility of the as designed final state of the manufacturing article.

On the basis of the foregoing review of the contexts 36, revised information may be introduced into at least one of the product information source 32 and the process information source 34, so that a revised plurality of the contexts 36 may be generated and evaluated. The evaluation of the contexts 36 may proceed by visually examining on a display device each of the contexts 36 under various selected viewing conditions. For example, and in one selected embodiment, selected portions of the assembly may be highlighted using a desired color while other portions of the assembly are uniformly presented in a contrasting color, so that the selected portion may be clearly viewed. In another specific embodiment, the selected portions of the assembly may be desirably highlighted, while other portions are viewed as "grayed" with lower contrast than the highlighted portions.

Still other specific embodiments of processes for visual examination are possible. For example, the selected portion of the assembly may be viewed using a minimum viewing option that shows all of the structure and processes that have occurred in a preceding path (as expressed, for example, in a precedence network corresponding to the assembly). Conversely, a maximum viewing option would be operable to provide a comprehensive view that includes not only a preceding path, but contributions from parallel paths in the precedence network also. Contexts may also be selectively viewed by applying a filter to the context that is based upon certain selected attributes of the assembly so that selected portions of the context may be viewed. Filtering the context advantageously permits a viewer to remove extraneous detail and view only the data that is relevant to the viewer. The context may also be viewed dynamically, so that selected portions of the context may be viewed in a desired position. For example, the context may be viewed in a position that is representative of the actual physical assembly. Accordingly, a viewer of the context may conveniently review ergonomic positions of an individual affecting the assembly, tool clearances available to the individual, and other similar details.

Still referring to FIG. 2, based upon successive generation and review of the contexts 36, a final context 38 is generated that reflects a relatively matured informational content in the product information source 32 and/or the process information source 34. The final context 38 may advantageously be used as a baseline context for future design and planning efforts, and may also be used as a training aid for instructing personnel in the proper assembly of a selected assembly. Still other uses for the final context 38 are possible. For example, it may be advantageously used to develop repair and/or maintenance operations. It is understood, however, that the final context may be continuously evolving, so that no entirely definitive context may exist.

Figure 3:
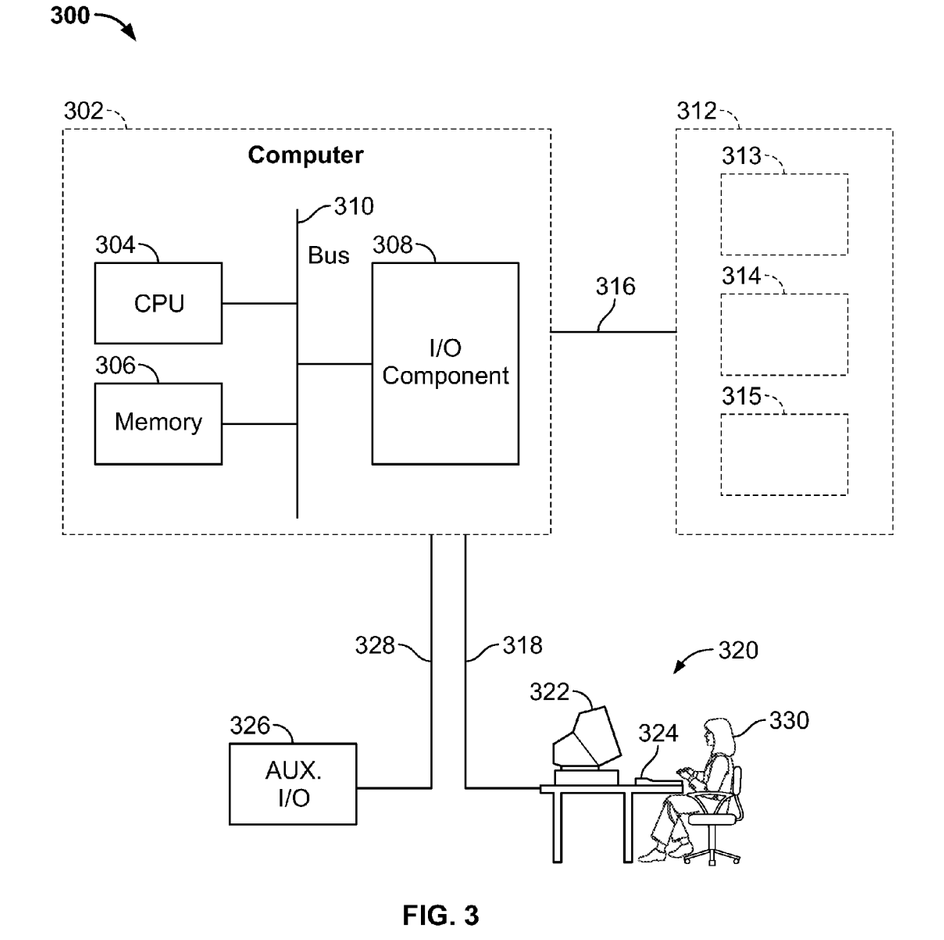
FIG. 3 is a system for performing a manufacturing process in accordance with an embodiment of the present invention.

As further shown in FIG. 3, the system 300 further includes a control component 320 having a display device 322 (such as a monitor, screen or other suitable display device) and a command input device 324 (e.g. a keyboard, an audio-visual input device, etc.). A second communication link 318 operatively couples the control component 320 to the computer 302. The system 300 also includes an auxiliary output device 326 coupled to the computer 302 by a third communication link 328. The auxiliary output device 326 may include a printer, a compact disk (CD) burner, a storage device, a communication port, or any other desired output device.

In one aspect, a machine-readable medium may be used to store a set of machine-readable instructions (e.g. a computer program) into the computer 302, wherein the machine-readable instructions embody a method of performing manufacturing operations in accordance with the teachings of the present invention. The machine-readable medium may be any type of medium which can store data that is readable by the computer 302, including, for example, a floppy disk, CD ROM, optical storage disk, magnetic tape, flash memory card, digital video disk, RAM, ROM, or any other suitable storage medium. The machine-readable medium, or the instructions stored thereon, may be temporarily or permanently installed in any desired component of the system 300, including, for example, the I/O component 308, the memory component 306, and the auxiliary output device 326. Alternately, the machine-readable instructions may be implemented directly into one or more components of the computer 302, without the assistance of the machine-readable medium.

In operation, the computer 302 may be configured to perform one or more of the aspects of the methods of manufacturing described above. For example, an operator 330 may input a command through the command input device 324 to cause the computer to retrieve product information from the first portion 313 of the data base 312 and process information from the second portion 314 of the data base 312. The computer 302 may then use a set of software instructions stored in the computer 302 (e.g. in the memory component 306) that performs one or more aspects of the methods of manufacturing described above on the product and process information, and may then transmit processed information to the third portion 315 of the data base 312. Alternately, one or more aspects of the various processes described above may be implemented in the computer 302 using any suitable programmable or semi-programmable hardware components (e.g. EPROM components).

Results of the processes performed by the computer 302 in accordance with one or more embodiments of the invention may be transmitted via the data bus 310 to the I/O component 308. The results may also be transmitted to the control component 320 and to the auxiliary output device 326 via the second and third communications links 318 and 328. The operator 330 may view the results of the one or more methods on the display device 322, and may take appropriate action, including revising analysis parameters and inputs, and continuing or repeating the one or more embodiments of analysis methods using different product and process information as desired. Various embodiments of system architecture have been provided herein and are disclosed in co-pending and commonly owned U.S. patent application Ser. No. 11/270,399 filed Nov. 9, 2005, entitled "Systems and Methods for Production Planning by Visualizing Products and Resources in a Manufacturing Process", which application is incorporated by reference herein.

Figure 4:
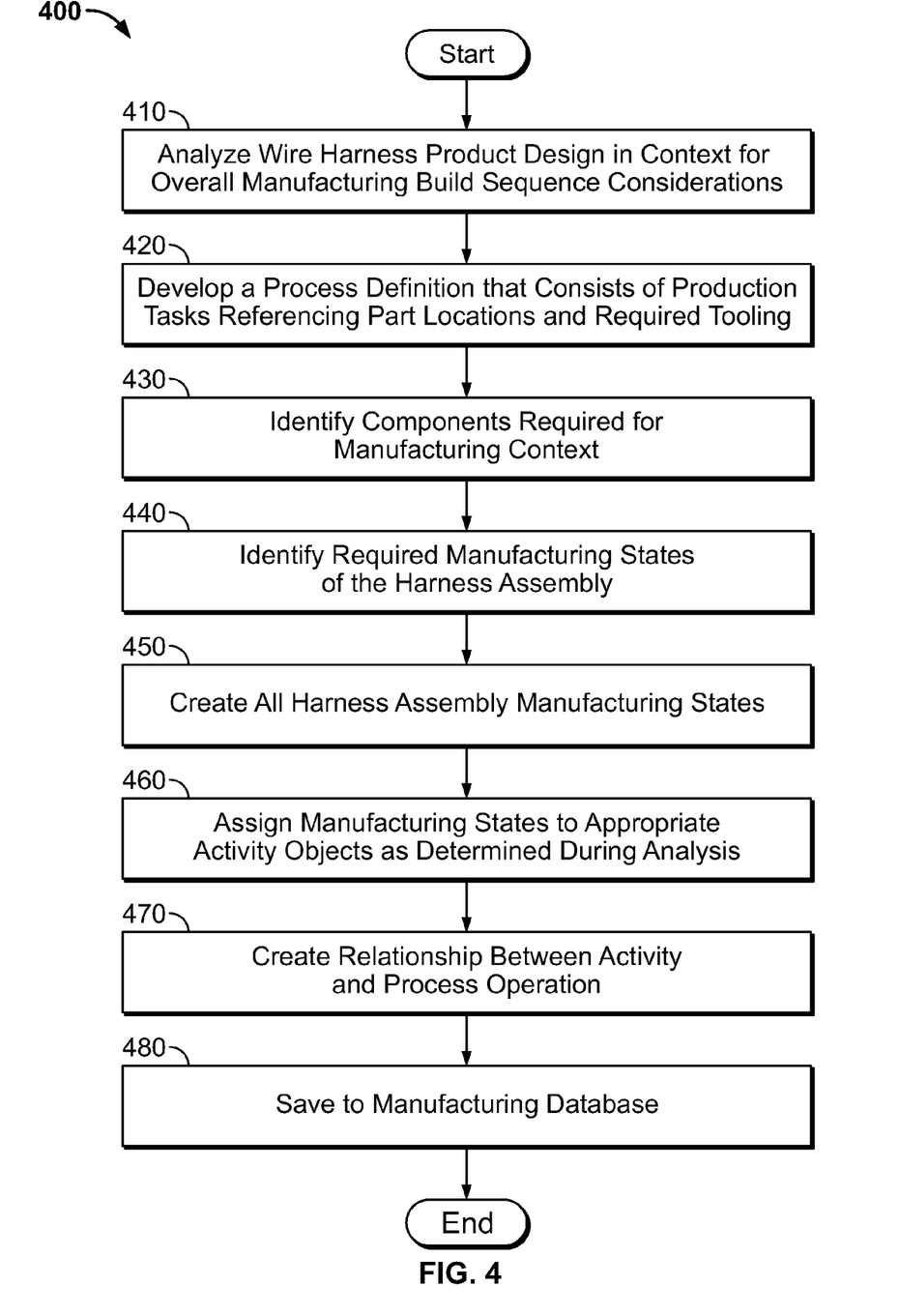
FIG. 4 is a flowchart that describes a method of process flow for creating and saving manufacturing states of an article of manufacture to a process database in accordance with another embodiment of the invention.

Referring to FIG. 4, an example of the process flow 400 for defining and saving manufacturing states of an article of manufacture to a process database is provided. In step 410, a product design (such as an electrical wire harness design for an aircraft) is analyzed in context for overall manufacturing build sequence considerations. The operator 330, such as a manufacturing engineer, for example, loads into session the models required to adequately determine the scope and nature of the product. The manufacturing engineer performs this through interaction with a multi-dimensional visualization process authoring application such as DELMIA DPM (digital process for manufacturing) manufactured by the DELMIA Company of Auburn Hills, Mich. (subsidiary of Dassault Systemes) or other suitable two-dimensional or three-dimensional process authoring applications. In step 420, a process definition that includes production tasks referencing part locations and required tooling is developed. The system operator (e.g. manufacturing engineer) determines what processes are required to perform the assembly or installation (such as in an aircraft or other vehicle) of the product as defined by the engineering data stored in product database 14. This may be performed through interaction with the process authoring application and is saved to the process database 16. The process authoring application (e.g. DELMIA DPM or DPE) is stored in memory 306 and the process information is stored in second portion 314 of database 312 while in session. The process data is ultimately saved in process database 16.

In step 430, the components needed for manufacturing context are identified. In this step, the system operator 330 (e.g. manufacturing engineer) interacting with the three-dimensional visualization process authoring application of system 300, brings into session background or reference structure needed to establish the context of the articles of manufacture required to support or otherwise aid in the representative display of a vehicle state of assembly. The operator interacting with the visualization application or tool (e.g. DELMIA DPM or CATIA digital modeling tool) of the computer system determines the background structure required to complete the particular manufacturing context. In the example of an electrical wire harness assembly in an aircraft, other computer models in addition to a wire harness computer model may be needed to provide the proper manufacturing context according to an installation plan. In step 440, the manufacturing states of the article of manufacture (such as an electrical wire harness assembly for an aircraft) are identified. In particular, the manufacturing engineer may determine how many states or phases of completion the wire harness will pass through before it reaches the installed state as defined by the engineering data stored in product database 14.

In step 450, all harness assembly manufacturing states are created. In the example of an electrical wire harness for an aircraft, for instance, the manufacturing engineer creates each of the manufacturing states the harness will pass through. These manufacturing states, for example, may include individual branches moved out of their normal path, branches coiled up to a main trunk of a harness and the main trunk of the harness coiled up to the initial installation state or combinations of the manufacturing states. The manufacturing states are saved to the process database 16. In step 460, the manufacturing states are assigned to appropriate activity objects as determined during analysis in step 440. The system operator, such as the manufacturing engineer, assigns or creates a relationship of the manufacturing states to manufacturing state activity objects. Process objects, for example, may include installation plan objects, operation objects and manufacturing state activity objects. An operation object may be a child of an installation plan object and a manufacturing state activity object may be a child of the operation object. The manufacturing processes are defined in the computing system 10 by creating process objects, establishing relationships between the process objects and associating data stored in the product database 14 to the process objects.

The manufacturing state activity objects are stored in the process database 16. These activity objects are stored in the process database 16 but outside of the binary large object (BLOB) which contains information and data related to a single installation plan. Having these activity objects saved to the database outside of the BLOB allows visibility of the manufacturing states outside of the installation plan that the manufacturing states are created in. Assigning manufacturing states to activity objects allow other users (system operators, manufacturing engineers, etc.) to use these defined states in their manufacturing context. In step 470, a relationship between the manufacturing state activity object and the manufacturing process operation is created. In this step, the manufacturing engineer creates a relationship between the manufacturing state activity object and an operations process object. Manufacturing state activity objects are computing objects that hold, but are not limited to the following: attributes, tolerancing, positioning or any data required to define the manufacturing states of the article of manufacture. The relationship created is stored in the process database 16. In step 480, the process plan is saved to the manufacturing process database 16.

Figure 5:
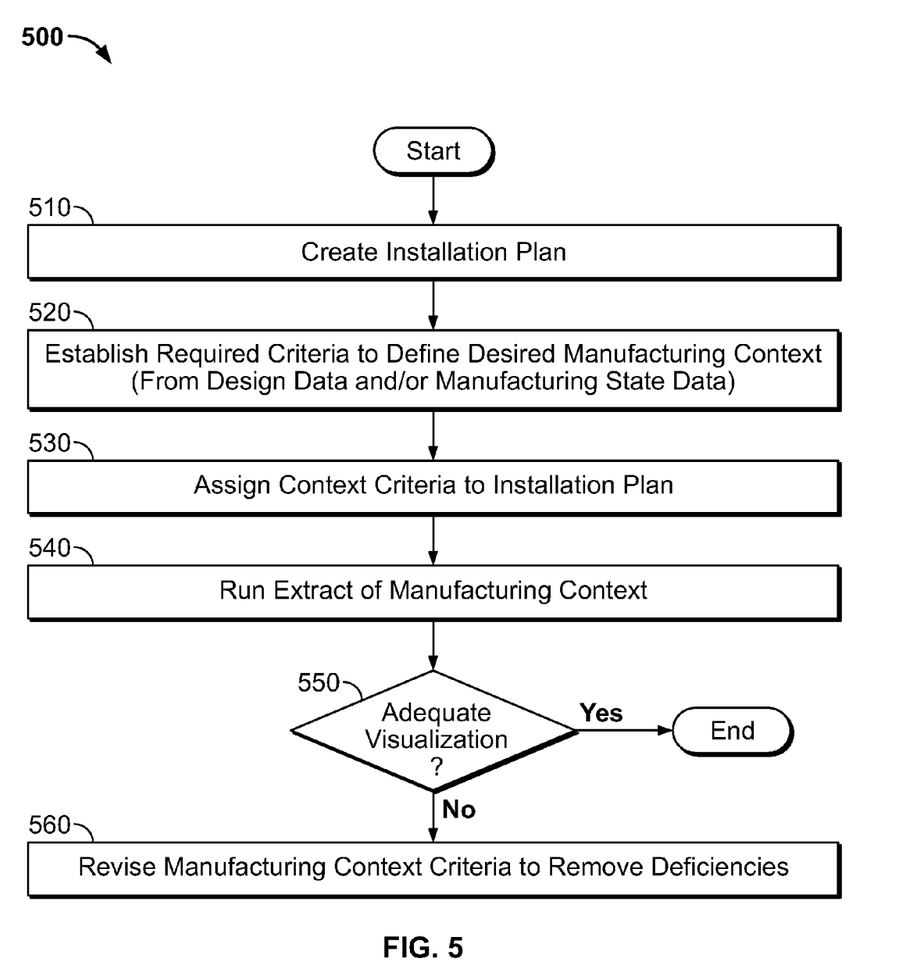
FIG. 5 is a flowchart that describes a context flow that utilizes the manufacturing states in an installation plan to represent a manufacturing context at a prescribed point in time in accordance with another embodiment of the invention.

Referring to FIG. 5, an example of the process steps for context flow 500 that utilizes manufacturing states in an installation plan to represent the manufacturing context at a prescribed point in time is provided. In step 510, an installation plan is created in order to provide the parent object that the manufacturing context will be associated to. If an installation plan does not already exist, the system operator (such as a manufacturing engineer) will create one using the process authoring application operating at the computer system. The created installation plan is then stored at the process database 16. In step 520, the criteria to define a desired manufacturing context is established from design data and/or manufacturing state data. In this step, the system operator (e.g. manufacturing engineer) establishes the context of the larger product. For example, a larger product may be an aircraft, automobile, satellite or any other large scale complex assembly. In particular, in the case of an electrical wire harness installation, the large scale complex assembly may be an aircraft, rocket, satellite or other vehicle that the electrical wire harness is being installed in. The context may be established using filters and the precedence of the process flow as provided in FIG. 4.

In step 530, context criteria is assigned to the installation plan. For example, the system operator 330, such as a manufacturing engineer, may assign the manufacturing context to an operation within the installation plan using a manufacturing state activity object. The manufacturing context is then saved to the process database 16 with a relationship to the installation plan. In step 540, an extract of the manufacturing context is performed. The system operator reviews the installation plan and will examine, for example, the background structure (such as in an electrical wire harness installation) to be sure the correct quantity and type of models are included to provide installation personnel with an adequate visual display of the state of the large scale complex assembly. In step 550, the system operator determines if adequate visualization has been met by analyzing the completeness and relevancy of the manufacturing context displayed. If it is determined that adequate visualization of manufacturing context has been created then the project is saved to the process database 16 and the process authoring application is exited. If it is determined (by the manufacturing engineer, for example) that adequate visualization of the manufacturing context is not met, then in step 560 the manufacturing context criteria is revised to remove deficiencies. The manufacturing engineer, for example, may redefine the criteria for the manufacturing context, include or exclude computer models as needed, and repeat the steps of context flow 500 again until satisfactory visualization of manufacturing context is achieved.

The foregoing description of the preferred embodiments of the invention have been presented for purposes of illustration and description, and are not intended to be exhaustive or to limit the invention the precise forms disclosed. The descriptions were selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. A computer-implemented method of creating and using manufacturing state models in a manufacturing process comprising:
    providing an installation plan, containing information and data related to the installation plan that is saved in a binary large object, for an article of manufacture;
    creating manufacturing state models for the article of manufacture at different time periods of a manufacturing process for display as manufacturing contexts relating to the installation plan;
    assigning the manufacturing state models to activity objects;
    storing the activity objects in a process database outside of the binary large object as the manufacturing state models are created during the manufacturing process; and
    visually displaying the manufacturing contexts, comprising the created manufacturing state models stored as the activity objects in the process database outside of the binary large object, with at least one other manufacturing context relating to a different installation plan for a different article of manufacture.

2. The method of claim 1 further comprising establishing a relationship between the activity objects and process objects.

3. The method of claim 2 further comprising storing the established relationship between the activity objects and the process objects in the process database.

4. The method of claim 1 wherein the step of creating manufacturing state models includes developing a process definition comprising production tasks referencing part locations and tooling.

5. The method of claim 4 wherein the step of developing the process definition includes determining a process required to perform an installation of the article of manufacture as defined by engineering data.

6. The method of claim 4 wherein the steps of creating and storing are performed using a multi-dimensional visualization process authoring application.

7. The method of claim 6 in which the article of manufacture is an electrical wire harness or tubing run for installation in an aircraft.

8. The method of claim 4 further comprising identifying components for the manufacturing contexts.

9. The method of claim 8 further comprising determining a number of different states the article of manufacture will pass through before reaching a final installed state defined by engineering data.

10. The method of claim 9 further comprising establishing criteria to define the manufacturing contexts from the engineering data or manufacturing state data.

11. The method of claim 10 further comprising assigning the criteria to the installation plan and assigning the manufacturing contexts to an operation within the installation plan using the activity objects, and saving the manufacturing contexts to the process database.

12. The method of claim 1 wherein the manufacturing state models comprise two or three-dimensional wire harness manufacturing state models.

13. The method of claim 1 further comprising storing an established relationship between the manufacturing state models and the activity objects in the process database.

14. The method of claim 1 further comprising using the displayed manufacturing contexts to assist in manufacturing the different article of manufacture under the different installation plan.

15. A computer-implemented system for using created manufacturing state models in a manufacturing process comprising:
- a binary large object containing information and data related to an installation plan for an article of manufacture;
- a process authoring application adapted to create manufacturing state models for the article of manufacture at different time periods of a manufacturing process for display as manufacturing contexts relating to the installation plan, and adapted to assign the manufacturing state models to activity objects;
- a process database for storing the activity objects outside of the binary large object as the manufacturing state models are created and applied during the manufacturing process; and
- a display device that visually displays the manufacturing contexts, comprising the created manufacturing state models stored as the activity objects in the process database outside of the binary large object, with at least one other manufacturing context relating to a different installation plan for a different another article of manufacture.

16. The system of claim 15 wherein the process database is configured to store an established relationship between the activity objects and process objects.

17. The system of claim 15 wherein the process authoring application is adapted to develop a process definition comprising production tasks referencing part locations and tooling.

18. The system of claim 17 wherein the process authoring application is adapted to determine a process required to perform an installation of the article of manufacture as defined by engineering data stored in an engineering information database.

19. The system of claim 15 wherein the article of manufacture is an electrical wire harness or tubing run for installation in an aircraft.

20. The system of claim 15 wherein the process authoring application is adapted to identify components for the manufacturing contexts and to determine a number of different states the article of manufacture will pass through before reaching a final installed state defined by engineering data stored in an engineering information database.

21. The system of claim 20 wherein the process authoring application is adapted to assign manufacturing context criteria to the installation plan, to assign the manufacturing contexts to an operation within the installation plan using the activity objects, and to save the manufacturing contexts to the process database.

22. The system of claim 15 wherein the process authoring application is adapted to create the manufacturing state models, which comprise two-dimensional or three-dimensional wire harness manufacturing state models, and to store the two-dimensional or three-dimensional wire harness manufacturing state models in the process database.

23. The system of claim 15 wherein the process database is configured to store an established relationship between the manufacturing state models and the activity objects.

24. The system of claim 15 wherein the manufacturing contexts displayed on the display device are configured to assist in manufacturing the different article of manufacture under the different installation plan.

\* \* \* \* \*